Dec. 8, 1959     G. VARNEY     2,915,988
MODEL RAILWAY TRUCK
Filed March 31, 1958
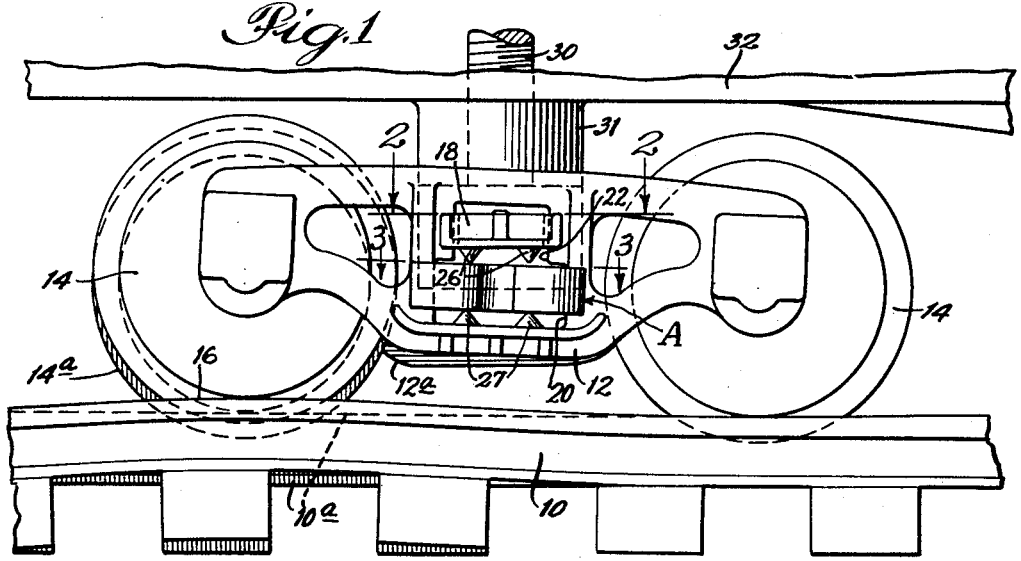
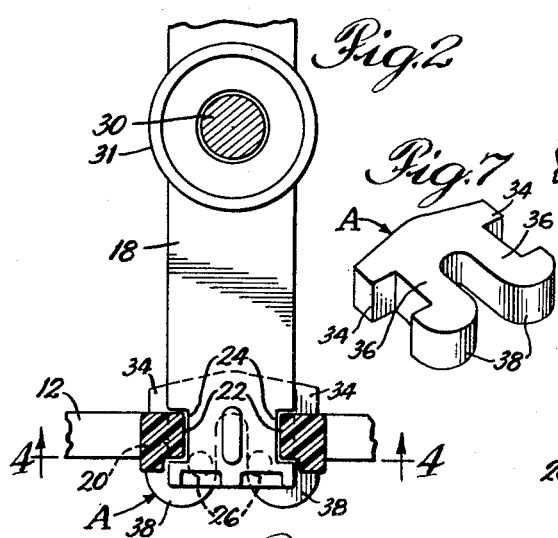
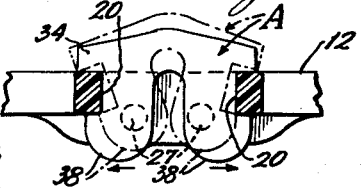
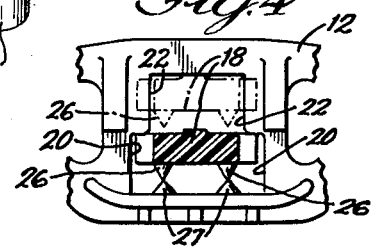
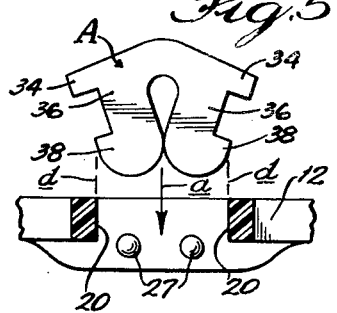
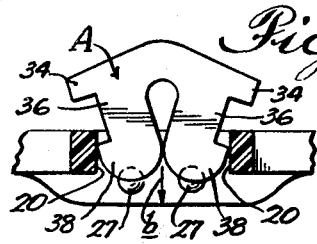
INVENTOR:
Gordon Varney,
BY Bair, Freeman & Molinare
ATTORNEYS

United States Patent Office 2,915,988
Patented Dec. 8, 1959

2,915,988

MODEL RAILWAY TRUCK

Gordon Varney, Miami, Fla., assignor to Varney Model Manufacturing Co., Inc., Miami, Fla., a corporation of Florida Application March 31, 1958, Serial No. 725,227

7 Claims. (Cl. 105—197)

This invention relates to a model railway truck and particularly to the structure thereof and a novel insert for effecting a connection between a pair of truck frames and the ends of a bolster.

One object of the invention is to provide connecting means in the form of an insert of resilient material such as nylon, polyethylene or similar plastic which is inexpensive to manufacture and easy of assembly in relation to the truck frame and bolster, and when assembled therewith serves to permanently connect them together in such manner that there is complete freedom of flexibility that keeps all four wheels of the truck on the track even though the track is irregular and permits the wheels to readily pass over obstructions and return immediately to the track thereby minimizing the chances for derailment.

Another object is to provide an insert that may be squeezed together and forced through an opening of the truck frame whereupon it springs apart to its original shape and thereupon forms a permanent connection with the truck frame for retaining the end of the bolster assembled relative thereto.

A further object is to provide an insert that cooperates with the bolster end and a T-shaped opening in a truck frame so as to keep the bolster end in the narrow portion of the T-shaped opening, the insert being so constructed as to be sprung into position in the wide part of the T-shaped opening and permanently remain therein after once being inserted.

With these and other objects in view, my invention consists in the construction, arrangement and combination of the various parts of my model railway truck, whereby the objects above contemplated are attained, as hereinafter more fully set forth, pointed out in my claims and illustrated in detail on the accompanying drawings, wherein:

Fig. 1 is a side elevation of a truck frame of my proposed construction showing the action thereof when one wheel passes over a hump in the track;

Fig. 2 is a horizontal sectional view on the line 2—2 of Fig. 1 above the bolster showing the cooperation of its end with the narrow part of a T-shaped opening of the truck frame;

Fig. 3 is a horizontal sectional view on the line 3—3 of Fig. 1 showing the novel insert used for keeping the bolster end in assembled relation to the truck frame;

Fig. 4 is a vertical sectional view on the line 4—4 of Fig. 2 showing the T-shaped slot in the truck frame and how the bolster end is inserted relative thereto;

Fig. 5 is a view somewhat similar to Fig. 3 showing a preliminary step in contracting the insert for insertion into the opening of the truck frame;

Fig. 6 is a similar view showing the insert being inserted through the opening; and Fig. 7 is a perspective view of the insert per se.

On the accompanying drawing I have used the reference numeral 10 and 10a to indicate the near side and far side rails respectively of a model railway track. The rail 10 is illustrated humped at 16. Truck frames 12 and 12a of synthetic resin or plastic material are shown, 12 being the near side frame and 12a the far side frame, and wheels 14 and 14a are journalled therein for riding the rails 10 and 10a. The truck frames 12 and 12a are connected together by a bolster 18, the ends of which are notched as indicated at 24 in Fig. 2, and these notches are located in the narrow portion 22 of a T-shaped opening in the truck frame 12, the wide portions of which are indicated at 20. As shown in Figs. 1 and 3, an insert A is located in the wide portion 20 and serves as a retainer for the bolster end relative to the truck frame. The center of the bolster is loosely connected by a screw 30 to a boss 31 depending from the floor 32 of a model freight or other car and the loose connection permits limited up and down floating of the ends of the bolster 18.

The insert A is T-shaped, having a pair of arms 34 and a pair of legs 36 with a notch 40 between them instead of the usual single leg of a T, and the lower ends of these legs have hook-like projections 38. The insert A is made of resilient material such as some form of plastic (nylon, polyethylene or the like) so that it can be sprung from the shape shown by solid lines in Figs. 2 and 3 to the shape shown in Figs. 5 and 6 and the notch 40 between the legs 36 permits of such bending so that the distance across the extremities of the hook-like projections 38 is less than the width of the slot 20 as shown by the dash lines $d$ in Fig. 5.

In the assembly of a model railway truck in accordance with my invention the end of the bolster 18 is first projected into the opening 20 as shown by solid lines in Fig. 4 and then moved upwardly (dotted line showing) so that the notches 24 receive the edges of the narrow portion 22 of the T-shaped slot as in Figs. 1 and 2 and it will be obvious that if the bolster end is retained in this position, the two cannot become disassociated from each other. Referring to Fig. 5, an insert A is squeezed by a suitable tool to the position shown so that it can be inserted under the bolster 18 in accordance with the arrow $a$ and as illustrated in Fig. 6 through the opening 20. Further movement of the insert into the opening as indicated by the arrow $b$ in Fig. 6 results in the position shown by dotted lines in Fig. 3 and slight further movement then permits the insert to spring to its original shape as shown by solid lines so that it is then permanently mounted in the portion 20 of the T-shaped opening of the truck frame and keeps the bolster end in its desired position.

When in the assembled position the insert A rests on a pair of bumps 27 on the lower surface of the T-shaped openings 20—22 and a pair of bumps 26 projecting downwardly from the bolster end normally rest on the upper surface of the insert A and permit pivoting of the truck frame relative to the bolster end as shown in Fig. 1.

It will be noted that when one of the wheels 14 passes over the hump 16 the truck frame 12 is tilted relative to the truck frame 12a and also relative to the bolster end so that only one of the projections 26 engage the insert A with a tendency to readily bring the truck frame 12 down again as the hump is passed with complete freedom of flexibility. The bolster end is free to float loosely in the opening 22 and ride on the insert A in such manner as to always tend to level the truck frame down again after a track hump or obstruction is passed.

With a construction such as shown there is complete flexibility of the truck frames on the bolster ends which gives the truck full equalization on an even track. In the case of light-weight cars this is important. The action afforded by my construction keeps all four wheels on the rails. It is superior to the usual truck having steel coil springs to support the bolster because such springs are of necessity sprung so heavily that a light car will not flex them. Also, the assembly of the parts is extremely simple, the plastic piece being readily inserted while springs are exceedingly difficult to install and twice as many are required.

My truck construction is virtually indestructible as the parts will not come apart which sometimes happens when sprung trucks are dropped on the floor. Actually a truck, according to my proposal, can be thrown on the floor without damage.

Some changes may be made in the construction and arrangement of the parts of my model railway truck without departing from the real spirit and purpose of my invention, and it is my intention to cover by my claims any modified forms of structure or use of mechanical equivalents which may reasonably be included within their scope.

I claim as my invention:

1. In a model railway truck insert for a truck frame having an opening therethrough and a bolster having its ends projecting into said opening of said truck frame and having guide notches coacting with opposite edges of the opening; said insert being located in said opening to retain said bolster end therein and permit free flexing of the truck frame relative to the bolster, said insert comprising a T-shaped member having a pair of spaced legs terminating in hook-like projections, said insert being formed of resilient material and the distance across said projections being greater than the width of said opening to overhand the edges thereof and thereby retain said insert in said truck frame.

2. In a model railway truck insert for a truck frame having an inverted T-shaped opening therethrough and a bolster having its end projecting into said opening of said truck frame and the sides of said bolster being notched adjacent said end to receive the edges of the narrow portion of said T-shaped opening; the lower surface of said bolster adjacent the end thereof having a pair of insert engaging bumps, said insert being positioned in the wide portion of said T-shaped opening to retain said bolster end therein and permit free flexing of the truck frame relative to the bolster, said insert comprising a T-shaped member having a pair of legs terminating in hook-like projections being formed of resilient material and having the distance across said projections greater than the width of said opening for thereby overhanging the edges thereof to retain said insert in said truck frame.

3. In a model railway truck insert for a truck frame having an inverted T-shaped opening therethrough and a bolster having its end projecting into said opening of said truck frame and the sides of said bolster being notched adjacent said end to receive the edges of the narrow portion of said T-shaped opening; the lower surface of said bolster adjacent the end thereof having a pair of insert engaging bumps, said insert being positioned in the wide portion of said T-shaped opening to retain said bolster end therein and permit free flexing of the truck frame relative to the bolster, said insert comprising a T-shaped member having a pair of legs terminating in hook-like projections, said insert being formed of resilient material with the distance across said projections greater than the width of said opening to overhang the edges thereof to retain said insert in said truck frame, the truck frame having a pair of bumps located on the bottom surface of said T-shaped opening to engage the bottom of said insert.

4. In a model railway truck insert for retaining the notched end of a bolster in an opening of a truck frame; a T-shaped member having a pair of legs terminating in hook-like projections, said insert being formed of resilient material and the distance across said projections being greater than the width of said opening to overhang the edges thereof and thereby retain said insert and the notched bolster end in said opening.

5. In a model railway truck insert for retaining the notched end of a bolster in an opening of a truck frame; a T-shaped member having a pair of legs terminating in hook-like projections, said insert being formed of resilient material and the distance across said projections being greater than the width of said opening to overhang the edges thereof to retain said insert and the bolster end therein with said bolster end floating in said opening and resting on said insert.

6. In a model railway truck insert for retaining the notched end of a bolster in an opening of a truck frame; a T-shaped member having a pair of legs terminating in hook-like projections, said insert being formed of resilient material and the distance across said projections being greater than the width of said opening to overhang the edges of said opening to retain said insert and the bolster end therein, said bolster end floating in said opening and having a pair of space bumps for resting on said insert.

7. In a model railway truck insert for a truck frame having an opening therethrough and a bolster having its end projecting into said opening of said truck frame; said insert being positioned in said opening to retain said bolster end therein and permit free flexing of the truck relative to the bolster, said insert comprising a T-shaped member having a pair of legs terminating in hook-like projections which overhang the edges of said opening to retain said insert in said truck frame.

References Cited in the file of this patent

UNITED STATES PATENTS

| | | |
|---|---|---|
| 1,141,436 | Turner | June 1, 1915 |
| 2,066,602 | Barrows et al. | Jan. 5, 1937 |
| 2,674,449 | Tucker | Apr. 6, 1954 |
| 2,747,519 | Heater et al. | May 29, 1956 |